(12) United States Patent
Amano

(10) Patent No.: US 7,458,036 B2  
(45) Date of Patent: Nov. 25, 2008

(54) DISPLAY DEVICE, DISPLAY METHOD AND IMAGE FORMING APPARATUS

(75) Inventor: Koji Amano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 493 days.

(21) Appl. No.: 09/985,999

(22) Filed: Nov. 7, 2001

(65) Prior Publication Data

US 2002/0063697 A1 May 30, 2002

(30) Foreign Application Priority Data

Nov. 14, 2000 (JP) ............................. 2000-346420
Aug. 28, 2001 (JP) ............................. 2001-258117

(51) Int. Cl.  
*G06F 3/048* (2006.01)

(52) U.S. Cl. ...................................... 715/825

(58) Field of Classification Search ......... 345/764–766, 345/700–702, 810, 835–840, 846; 358/400–401, 358/501; 399/81; 715/764, 766, 765, 810, 715/835, 836–840, 846, 811, 825, 826  
See application file for complete search history.

(56) References Cited

U.S. PATENT DOCUMENTS

| | | | |
|---|---|---|---|
| 5,548,692 A * | 8/1996 | Cok | 345/815 |
| 5,625,783 A * | 4/1997 | Ezekiel et al. | 719/320 |
| 5,754,179 A * | 5/1998 | Hocker et al. | 345/835 |
| 5,880,727 A * | 3/1999 | Barrett et al. | 345/854 |
| 6,121,968 A * | 9/2000 | Arcuri et al. | 715/825 |
| 6,308,023 B1 * | 10/2001 | Nomura et al. | 399/81 |
| 6,433,801 B1 * | 8/2002 | Moon et al. | 715/840 |
| 6,469,719 B1 * | 10/2002 | Kino et al. | 345/810 |
| 6,570,667 B1 * | 5/2003 | Hattori et al. | 358/1.15 |
| 6,587,129 B1 * | 7/2003 | Lavendel et al. | 715/776 |
| 6,618,061 B2 * | 9/2003 | Yamamoto | 345/817 |
| 6,741,262 B1 * | 5/2004 | Munson et al. | 345/594 |

FOREIGN PATENT DOCUMENTS

JP  7-307817 A  11/1995

* cited by examiner

*Primary Examiner*—Thanh T Vu  
(74) *Attorney, Agent, or Firm*—Oliff & Berridge, PLC

(57) ABSTRACT

A display device for displaying a plurality of options. When the number of the options to be displayed is to be changed according to aspects of display, the display device is controlled so that at least one of the options can be displayed in a display position which differs in accordance with the aspect of display. The display device may be controlled so as to change sizes or shapes of the options. Thus, the options can be displayed giving consideration to balance between a display screen and the options to be displayed, thereby accomplishing display which is pleasing in appearance.

26 Claims, 21 Drawing Sheets

FIG. 3

FRAME RAM

| |
|---|
| |
| |
| NUMBER OF BUTTONS TO BE DISPLAYED OF DUPLEX/ SIMPLEX BUTTON SET |
| ⋮ |
| STATE OF SIMPLEX→SIMPLEX BUTTON (OFF/ON) |
| ⋮ |

F I G. 4
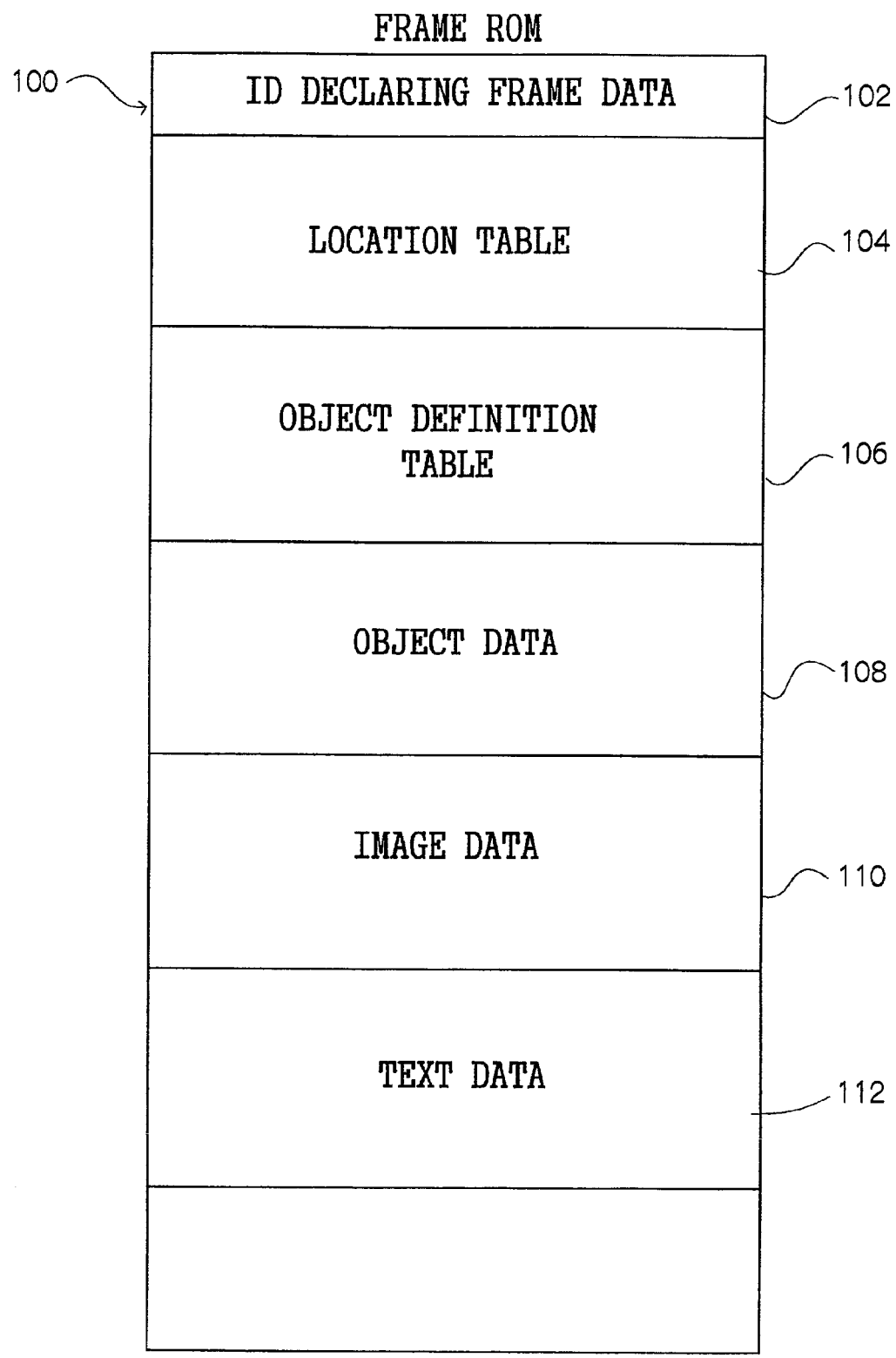

FIG. 5A

OBJECT DEFINITION TABLE

| OBJECT NAME | POINTER |
|---|---|
| ⋮ | |
| DUPLEX/SIMPLEX SELECTION SCREEN | → (A) |
| CLOSE BUTTON | → |
| CANCEL BUTTON | → |
| DUPLEX/SIMPLEX BUTTON SET | (B) |
| SIMPLEX→SIMPLEX BUTTON | |
| SIMPLEX→DUPLEX BUTTON | |
| DUPLEX→DUPLEX BUTTON | |
| DUPLEX→SIMPLEX BUTTON | |
| FINISHED STATE BUTTON SET | |
| REGISTRATION FOR SIDE BINDING BUTTON | |
| REGISTRATION FOR TOP BINDING BUTTON | |
| ORIGINAL SETTING ORIENTATION BUTTON SET | |
| TOP TO TOP ORIENTATION BUTTON | (C) |
| TOP TO LEFT ORIENTATION BUTTON | |
| ⋮ | |
| "SIMPLEX→SIMPLEX" TEXT | |
| "SIMPLEX→DUPLEX" TEXT | |
| "DUPLEX→DUPLEX" TEXT | |
| "DUPLEX→SIMPLEX" TEXT | |
| ⋮ | (D) |

F I G. 6 C
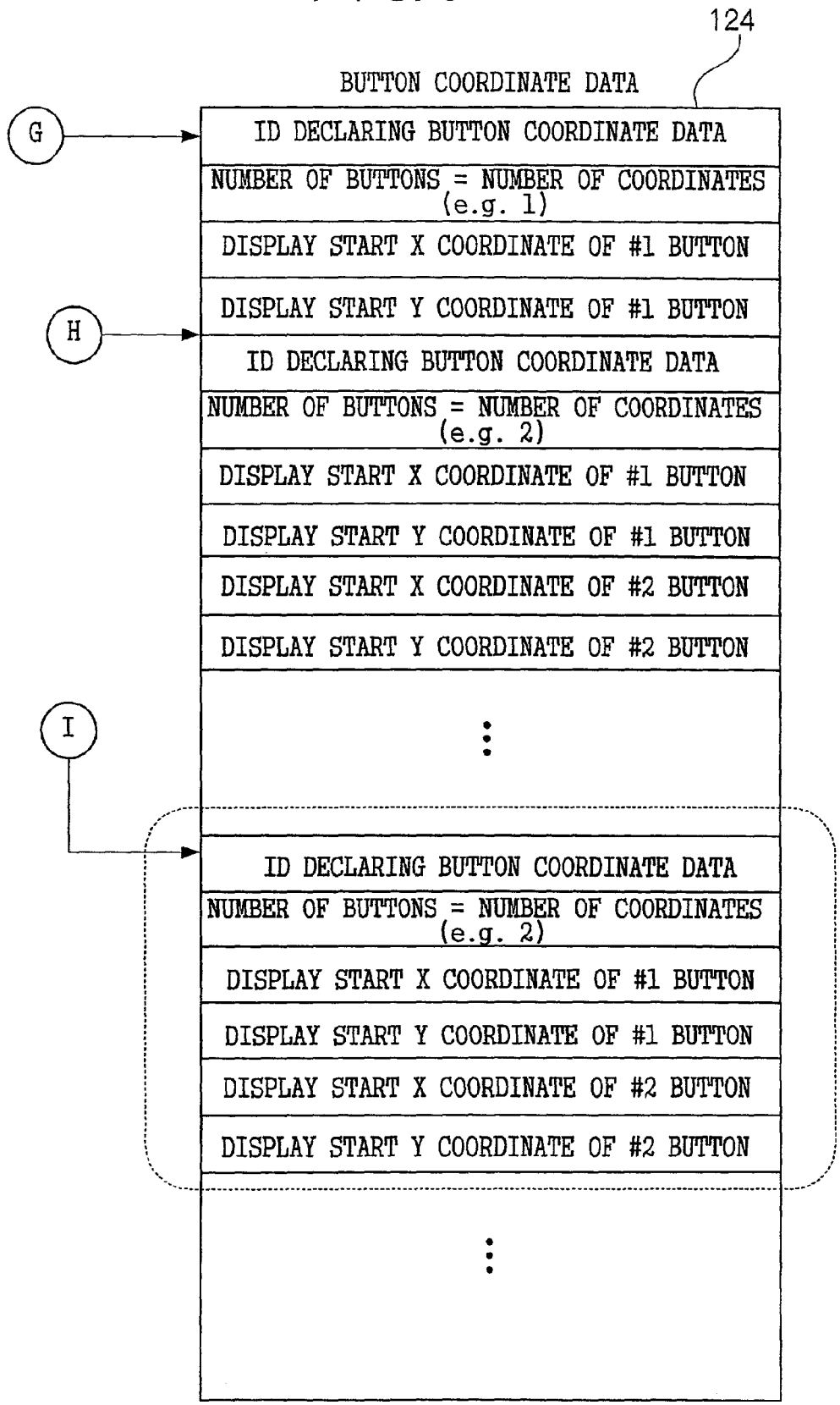

FIG. 7A

BUTTON INFORMATION RECEIVING-AREA COORDINATE TABLE 128

TABLE DISPLAYING ALL BUTTONS OF DUPLEX/SIMPLEX BUTTON GROUP

| NAME OF BUTTON | START X COORDINATE | START Y COORDINATE | END X COORDINATE | END Y COORDINATE | ADDRESS OF FUNCTION TO BE CALLED WHEN BUTTON IS PRESSED |
|---|---|---|---|---|---|
| .. | | | | | |
| .. | | | | | |
| SIMPLEX→SIMPLEX BUTTON | 20 | 80 | 60 | 118 | &ssPressProc |
| SIMPLEX→DUPLEX BUTTON | 20 | 120 | 60 | 158 | &sdPressProc |
| DUPLEX→DUPLEX BUTTON | 20 | 160 | 60 | 198 | &ddPressProc |
| DUPLEX→SIMPLEX BUTTON | 20 | 200 | 60 | 238 | &dsPressProc |
| .. | | | | | |
| .. | | | | | |

F I G. 7B

TABLE DISPLAYING ONLY SIMPLEX→SIMPLEX BUTTON AND SIMPLEX→DUPLEX BUTTON

| NAME OF BUTTON | START X COORDINATE | START Y COORDINATE | END X COORDINATE | END Y COORDINATE | ADDRESS OF FUNCTION TO BE CALLED WHEN BUTTON IS PRESSED |
|---|---|---|---|---|---|
| ... | ... | | | | |
| SIMPLEX→SIMPLEX BUTTON | 20 | 120 | 60 | 158 | &ssPressProc |
| SIMPLEX→DUPLEX BUTTON | 20 | 180 | 60 | 218 | &sdPressProc |
| DUPLEX→DUPLEX BUTTON | 640 | 240 | 0 | 0 | &ddPressProc |
| DUPLEX→SIMPLEX BUTTON | 640 | 240 | 0 | 0 | &dsPressProc |
| ... | ... | | | | |

FIG. 8
IMAGE DATA
OFF BITMAP 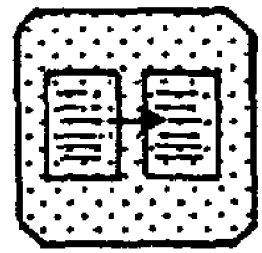
ON BITMAP 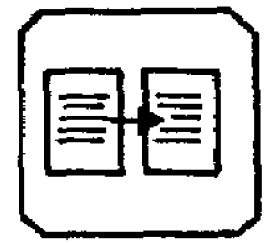
PRESS BITMAP 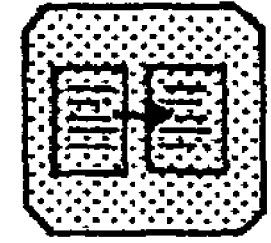

F I G. 9
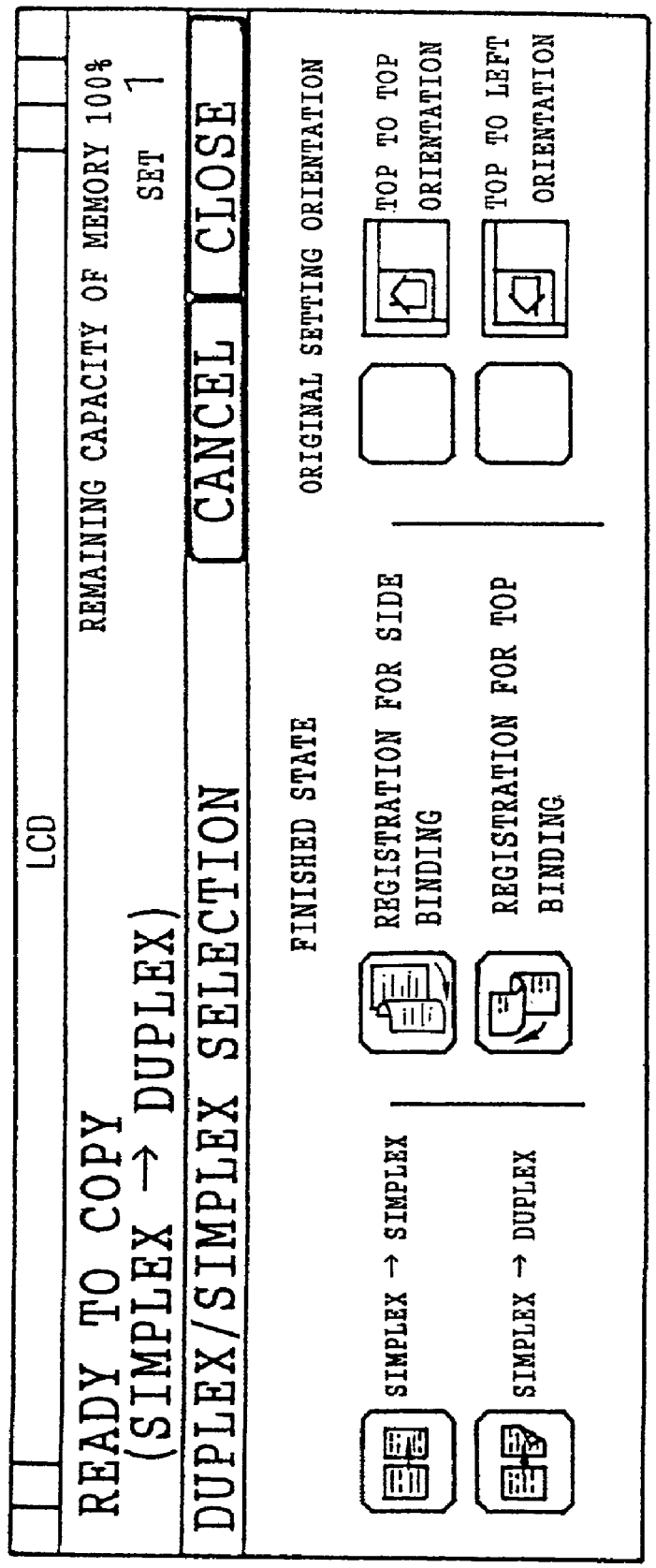

F I G. 1 4 A
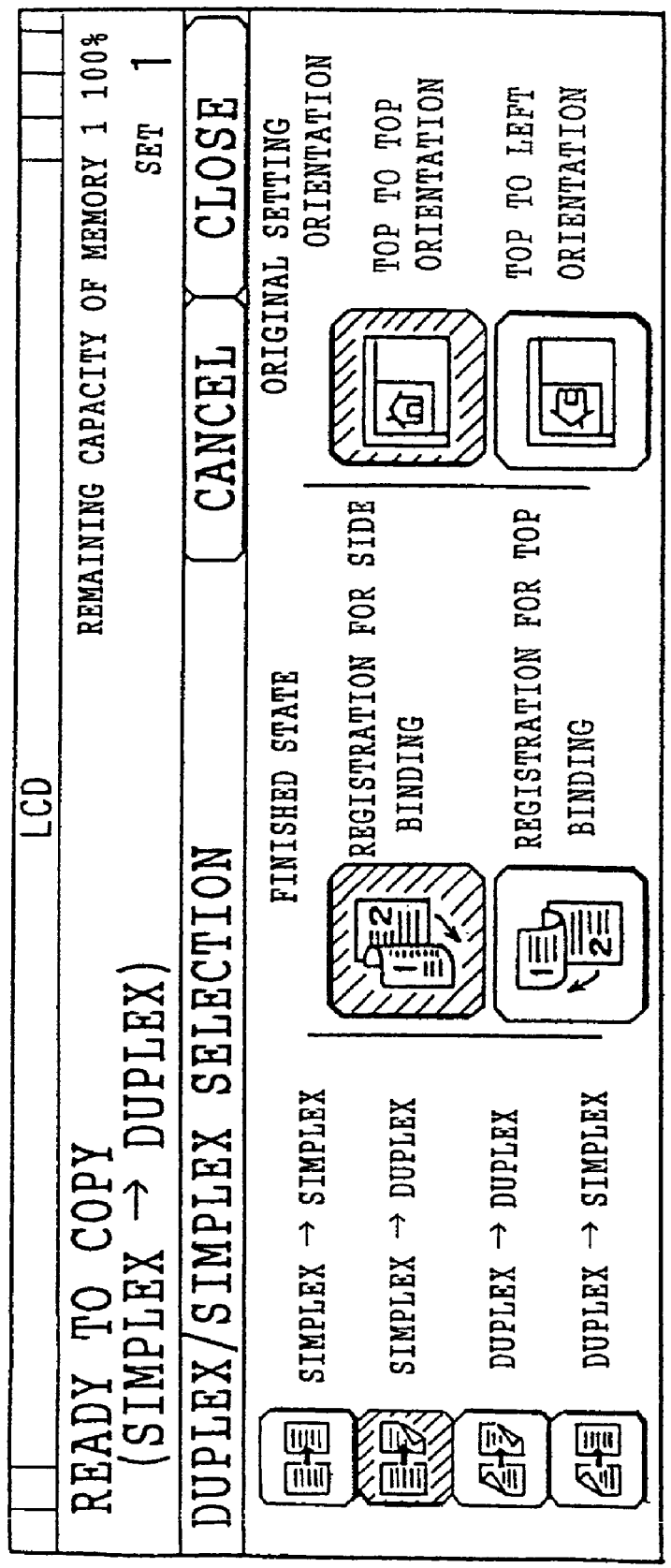

DISPLAY DEVICE, DISPLAY METHOD AND IMAGE FORMING APPARATUS

BACKGROUND OF THE INVENTION

1. Field of the Invention

The present invention relates to a display device, a display method and an image forming apparatus, and more particularly, to a display device and a display method for displaying options representing function items, and the like, of various machines, and an image forming apparatus (provided with the display device).

2. Description of the Related Art

Conventionally, various image forming apparatuses such as digital copiers, facsimile machines, printers, and the like, which are provided with a display device such as a so-called touch panel type display device at a user operation section thereof have been proposed. On this display device, particularly on the touch panel type display device, buttons and keys representing previously set function items of the image forming apparatus and a plurality of options associated with the functions are displayed. When a user selects, i.e., presses a desired button or key among these buttons and keys, the user can make the image forming apparatus execute various operations, can set various functions, or can instruct processing or execution of various functions.

By the way, buttons and keys displayed on a display device differ according to the number and types of functions and modules which can be added to an image forming apparatus on which the display device is provided. Usually, buttons and keys are designed and implemented based on the assumption that an image forming apparatus is provided with all of these additional functions and additional modules. Display positions of these buttons and keys on a touch panel are also determined based on the same assumption.

Therefore, if an image forming apparatus is one to which a so-called duplex copy function, which enables producing simplex copies from simplex originals, duplex copies from simplex originals, duplex copies from duplex originals, and simplex copies from duplex originals, can be added, and if the apparatus is provided with all of the additional functions, a display on a display device on the apparatus is such as shown in FIG. 10.

However, if an image forming apparatus is provided, for example, with only the copy functions from simplex to simplex and from simplex to duplex in the duplex copy function, and is not provided with the copy functions from duplex to duplex and from duplex to simplex, a conventional display device (on the apparatus) does not display the keys for the functions which have not been added, and merely displays the keys for the added functions in their original positions without any modification, as shown in FIG. 16. That is, when the display device is set to be able to display a plurality of buttons and keys, if some of functions corresponding to some of these buttons and keys are not added to the image forming apparatus, the conventional display device is designed such that the buttons and keys for the functions which are not added are simply not displayed, and no attempt has been made to adjust or change the display positions of the buttons and keys. Therefore, positions on the touch panel on which relevant buttons are not displayed are just left blank, which makes the display appear as if something is missing. If such a display is displayed on the display device, appearance of the display device is not pleasing.

SUMMARY OF THE INVENTION

In order to solve the above-described problem, objects of the present invention are to provide a display device and a display method which enable adjustment of display positions of options in order to improve the appearance of the display, as well as to provide an image forming apparatus including the display device.

In order to achieve the above-described object, a first aspect of the present invention is a display device for displaying options, which is controlled (using a controlling means) so that at least one of the options to be displayed in both the case in which all of the options are displayed and the case in which some of the options are displayed is in a position which is different in the cases in which all of the options are displayed than in the case in which some of the options are displayed.

The first aspect of the invention is applied to a display device for displaying options. The display device is connected, for example, with a machine such as an image forming apparatus, and can display the functions of the machine to which it is connected and options in the form of function items and messages associated with the functions. As the display device, a so-called touch panel type display device which allows a user to select among displayed options by directly touching the display screen of the display device, a display device which allows selection through use of a pointing device such as a mouse or keyboard, or the like, can be applied. In this display device, when there are a plurality of options, there is a case in which all of the options are displayed and a case in which some of the options are displayed. The case in which all of the options are displayed is, for example, a case in which all of optional devices and optional functions have been added to the host machine such as an image forming apparatus provided with the display device, and all of the options associated with the devices and functions are selectable. The case in which some of the options are displayed is, for example, a case in which only some of such optional devices and optional functions have been added, and it is enough to display only those options. When there may be several aspects of display such as described above, the display device is controlled so that display positions of the options are changeable and at least one of the options can be displayed in a position which is different in the case in which all of the options are displayed than in the case in which some of the options are displayed. Further, since the options include a plurality of function items, they are displayed in different positions according to their functions or their categories. Thus, the options can be displayed taking into consideration balance between the displayed options on the display screen, thereby accomplishing display which is pleasing in appearance.

A second aspect of the present invention is a display device for displaying options, which is controlled (using a controlling means) so that at least one of the options to be displayed in both the case in which all of the options are displayed and the case in which some of the options are displayed is of a size which is different in the case in which all of the options are displayed than in the case in which some of the options are displayed.

Similarly to the first aspect of the invention described above, the second aspect of the invention is applied to a display device for displaying options. The display device is controlled so that sizes, i.e., display areas, of the displayed options are different in the case in which all of the options are displayed than in the case in which some of the options are displayed. Since the options can be considered to represent various function items, if they are displayed so as to have different display areas depending on their users, their functions or their categories, appearance as well as ease in operation of the display device can be improved.

A third aspect of the present invention is a display device for displaying options, which is controlled (using a controlling means) so that at least one of the options to be displayed in both the case in which all of the options are displayed and the case in which some of the options are displayed has a shape which is different in the case in which all of the options are displayed than in the case in which some of the options are displayed.

Similarly to the first and second aspects of the invention described above, the third aspect of the invention is applied to a display device for displaying options. The display device is controlled so that a shape, i.e., a shape of a display area of at least one of displayed options is different in the case in which all of the options are displayed than in the case in which some of the options are displayed. Since the options can be considered to represent various function items, if they can be displayed in different shapes depending on their users, their functions or their categories, appearance as well as ease in operation of the display device can be improved.

A fourth aspect of the present invention is a display device for displaying options, wherein there is a case in which all of the options are displayed and a case in which some of the options are displayed, and the display device is controlled so that the options are displayed with a larger interval between the options when some of the options are displayed than when all of the options are displayed.

Similarly to the first through third aspects of the invention described above, the fourth aspect of the invention is applied to a display device for displaying options. The display device is controlled so that the options are displayed with an interval therebetween which is different in the case in which all of the options are displayed than in the case in which some of the options are displayed. That is, there is more space on the display screen when some of the options are displayed than when all of the options are displayed, since the options are fewer in this case. Therefore, by suitably changing the interval between the options according to the number of displayed options, display which is pleasing in appearance can be accomplished.

A fifth aspect of the present invention is a display device for displaying options, wherein there is a case in which all of the options are displayed and a case in which some of the options are displayed, and the display device is controlled so that the options are displayed in a larger size when some of the options are displayed than when all of the options are displayed.

Similarly to the first through fourth aspects of the invention described above, the fifth aspect of the invention is applied to a display device for displaying options. The display device is controlled so that the options are displayed in a size, i.e., with a display area, which is different in the case in which all of the options are displayed than in the case in which some of the options are displayed. Display areas for the respective options can be larger when some of the options are displayed than when, for example, all of the options are displayed. Specifically, when four options are displayed, the size of the options is small with respect to the display screen, while, when two options are displayed, the respective options can be displayed in a larger size with respect to the display screen than when four options are displayed. Therefore, sizes of the displayed options are suitably changeable according to the number of the displayed options.

A sixth aspect of the present invention is a display method for displaying options, wherein at least one of the options to be displayed in both the case in which all of the options are displayed and the case in which some of the options are displayed is displayed in a position, in a size or in a shape which is different in the case in which all of the options are displayed than in the case in which some of the options are displayed.

The sixth aspect of the invention is applied to a display method for displaying options. In this display method, for example, function items associated with functions of a machine can be displayed as the options. When there are a plurality of options, the assumption is that there is a case in which all of the options are displayed as well as a case in which some of the options are displayed. Therefore, at least one of the options is displayed in a position, in a size or in a shape which is different in the former case than in the latter case.

A seventh aspect of the present invention is an image forming apparatus comprising a display device for displaying options, which display device displays at least one of the options to be displayed in both the case in which all of the options are displayed and the case in which some of the options are displayed in a position, in a size or in a shape which is different in the case in which all of the options are displayed than in the case in which some of the options are displayed.

In the seventh aspect of the invention, the image forming apparatus comprises the display device for displaying options. The options include, for example, those associated with sheet trays, those associated with scaling (magnification) such as enlargement, reduction, and the like, and those associated with functions which can be performed in the image forming apparatus, such as options associated with duplex copying. These function options are displayed on the display device when the functions are enabled. All of these options can be displayed in the same shapes all the time or in the same sizes and in the same positions in both the case in which all of the options are displayed and the case in which some of the options are displayed. However, it is preferable that they are suitably displayed in different shapes, in different sizes or in different positions. Thus, display which is well-balanced with respect to the number of displayed options and which is pleasing in appearance can be accomplished.

Note that, the above-described display device can be structured as a touch panel type display device which can display a plurality of marks representing function items in an arranged manner at predetermined positions on a surface of a display panel in a predetermined area, and which allows a user to specify one of functions corresponding to one of the marks by touching the surface of the display panel within an area at which the mark is displayed, and which is provided with an arrangement control means for changing the arrangement of display of the marks when the number of the function items is changed according to a setting.

In this structure, when the number of the function items is changed according to a setting, the arrangement control means can change the arrangement of display of the marks. Specifically, for example, if there are four function items, and four marks such as buttons or keys associated with the function items are uniformly arranged with a regular interval therebetween, even if the number of the function items is changed to two, the two marks can be arranged uniformly or with a regular interval therebetween by changing the display arrangement. Thus, no blank is produced in the display area and display positions of the marks are not unbalanced with respect to the display area, thereby improving appearance of the display device.

Note that, change of the number of the function items may be detected automatically or manually, and timing of the detection may be suitably set. The detection may be timed so as to be carried out when the power of the display device is turned on, when a predetermined switch is turned on, or the like. Further, positions of the marks which are changed by the arrangement control means can be set and stored in advance as predetermined positional data, and can be determined by reading of the positional data.

Furthermore, the display positions of the marks may be calculated one by one when the arrangement is changed. Particularly, for example, if the entire display panel is formed of a dot matrix panel, the positions of the marks can be specified by coordinates, and coordinates of the display positions can be stored in advance or can be calculated one by one. Moreover, for example, if the display panel is formed of a plurality of strip-like dot matrix panels, information as to which strip the respective marks are arranged on, and which position on the strip the respective marks are arranged at can be stored in advance or can be calculated one by one.

In addition, the display device can be applied as a user interface of an image forming apparatus for forming an image on a predetermined sheet on the basis of an original image or image information.

Further, the above-described function items may be optional functions to be added to the image forming apparatus.

By making the function items optional functions to be added to the image forming apparatus, marks such as buttons and keys corresponding to the optional functions added to the image forming apparatus can be displayed, and marks corresponding to functions which are not added are not displayed. This improves appearance of the display device, and in turn improves appearance of the image forming apparatus.

Furthermore, in the above-described display device, the function items can be a duplex/simplex selection function which has at most four options and enables image formation on both sides or one side of predetermined sheets when images on originals are recorded on both sides or one side of the originals. The arrangement control means can arrange the options uniformly in a predetermined display area of the display device regardless of the number of the options to be changed.

If the function items to be added to the image forming apparatus is the duplex/simplex selection function, i.e., a so-called duplex function, and if an automatic duplex document feeder is not mounted as an additional function, image formation from duplex to duplex and duplex to simplex cannot be performed. Therefore, marks such as buttons and keys for these operations are not displayed. In this case, the display device does not display unnecessary marks, and at the same time, arranges necessary marks uniformly in the predetermined display area. This improves appearance of the display device.

In addition, the present invention can be applied as a display method for displaying, in an apparatus in which options may be changed, the options at a display section, wherein the respective options are displayed in positions which are different in the case in which all of the options are displayed than in the case in which some of the options are displayed.

The respective options are displayed in positions which are different in the case in which all of the options are displayed than in the case in which some of the options are displayed. Thus, the options are suitably displayed in different positions according to the number of the options, and this allows, for example, a uniform arrangement with respect to the display area.

Further, the present invention can be a method for arranging and displaying item buttons on a display device for displaying the item buttons on the basis of function items of a host apparatus which are changed according to addition and removal of additional devices. This is a method which is used in an image forming apparatus for forming images on predetermined sheets on the basis of original images or image information, to which several types of additional devices can be added and removed, wherein the item buttons are rearranged uniformly in a predetermined display area when the number of the displayed item buttons is changed along with a change of the number of the function items.

When the number of the displayed item buttons is changed along with a change of the number of the function items, the item buttons are rearranged uniformly in a predetermined display area. Therefore, there are no blank buttons and there is balance in the display, and a display which is pleasing in appearance can be accomplished.

BRIEF DESCRIPTION OF THE DRAWINGS

FIG. 3 is a chart illustrating an area of a frame RAM in the display device according to the embodiment of the present invention.

FIG. 4 is a chart illustrating data stored in a frame ROM in the display device according to the embodiment of the present invention.

FIG. 5A is a chart illustrating data in an object definition table in the frame ROM shown in FIG. 4.

FIGS. 7A and 7B are charts illustrating contents of data in a button information receiving area coordinate table.

FIG. 8 is a chart illustrating bitmap images for states of buttons displayed on the display device.

FIG. 9 is a chart illustrating a state of the display device according to the embodiment of the present invention, in which options associated with a so-called duplex function are displayed, and two buttons of all buttons are disposed thereon.

FIG. 14A is a chart illustrating a state of the display device according to the embodiment of the present invention, in which options associated with the so-called duplex function are displayed, and all buttons are displayed.

DESCRIPTION OF THE PREFERRED EMBODIMENTS

Hereinafter, an exemplary embodiment of the present invention is described in detail with reference to the drawings.

As a display device according to the present embodiment, a so-called touch panel type display device can be used.

On the touch panel type display device, a user can select a function associated with one of options displayed on a display screen and can instruct execution of operations associated with the function by pressing or touching a display area of the option on the display screen. Note that, displays such as an LCD, a CRT, and the like, can be used for the display screen of the touch panel type display device.

Figure 1:
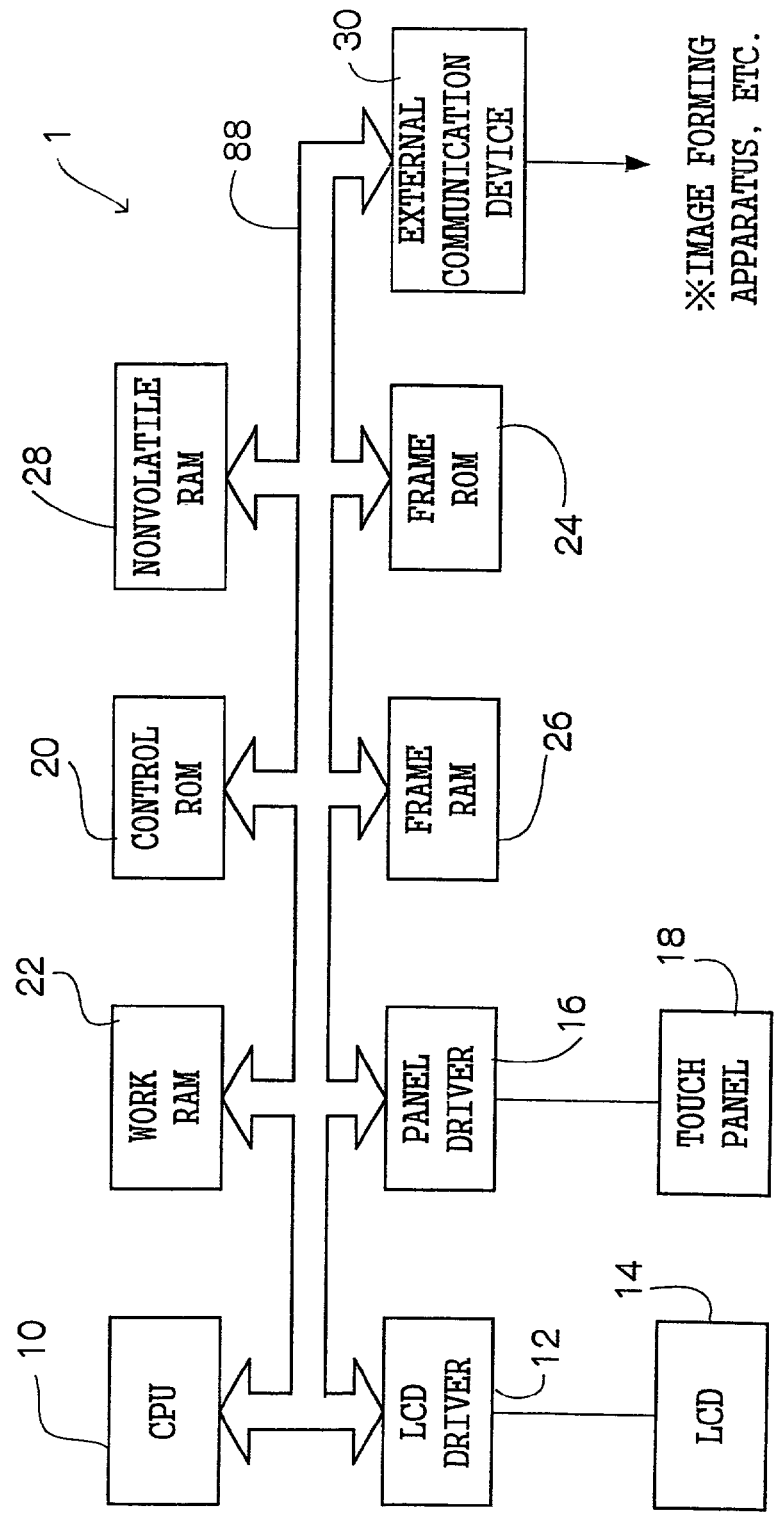
FIG. 1 is a block diagram showing an operation control section of a display device according to an embodiment of the present invention.
Figure 2:
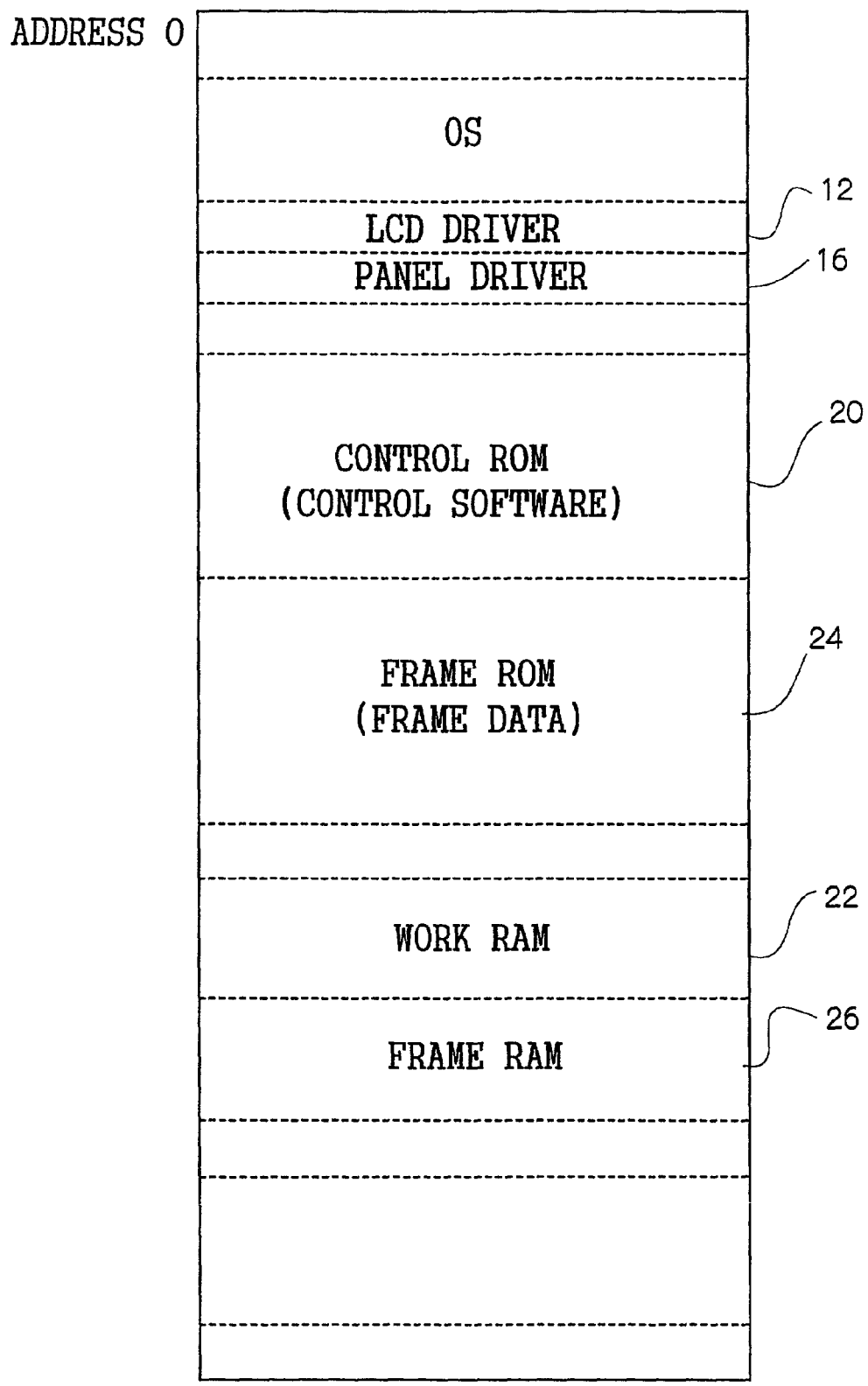
FIG. 2 is a chart illustrating disposition of various data, and the like, on a bus in the display device according to the embodiment of the present invention.

As shown in FIG. 1, a CPU 10 of a display device 1 functions as a center for controlling operations such as execution of various programs. The CPU 10 is connected with various circuit devices, and the like, (described below) through a bus 88 which is a transmission system. As shown in FIG. 2, the various circuit devices, and the like, are disposed on the bus 88 and are stored and set in predetermined areas.

An LCD 14, which serves as a display screen, is superposed on a touch panel 18. Buttons and keys (marks) are displayed on the LCD 14, and when one of the buttons and keys is pressed, the operation for the relevant button or key is recognized. An LCD driver 12 is connected with the LCD 14, and operates as an interface of the LCD 14 to control input into and output from the LCD 14. A panel driver 16 is connected with the touch panel 18, and operates as an interface of the touch panel 18 to control input into and output from the touch panel 18.

A control ROM 20 is a memory for storing control programs for an operation control section, such as a button-press program for determining whether the button can be pressed or not, and the like. Appropriate programs are read from the control ROM 20, and the relevant programs are executed by the CPU 10. A work RAM 22 is a so-called scratchpad memory used for reading and writing various data needed upon executing programs stored in the control ROM 20.

A frame RAM 26 is a scratchpad memory used for reading and writing data needed upon processing frame data 100 stored in a frame ROM 24 (described later), and also sets and manages states of various objects (see FIG. 3). A nonvolatile memory 28 serves as a backup memory which keeps stored data even when power for the operation control section is turned off. An external communication device 30 operates as an interface between the display device and other external machines such as an image forming apparatus.

A frame ROM 24 is a memory for storing the frame data 100, i.e., various screen data such as display positions of buttons to be displayed on the touch panel 18, and the like. As shown in FIG. 4, the frame data 100 includes an ID (identification) 102 for designating that the relevant data is the frame data 100, a location table 104 which is a table containing descriptions of head addresses of data in tables described later, an object definition table 106, object data 108, image data 110 and text data 112. Retrieval of various data is carried out through the location table 104. A structural size of the location table 104 is fixed, and retrieval can be performed in the intended manner even when the number of objects, images or texts is changed.

The display device may be used for selection of functions of an image forming apparatus. When the display device is used for an image forming apparatus, the display device displays options relating to functions provided in the image forming apparatus, and a user selects one of the options to instruct execution of operations relating to the relevant function. In this case, the options to be displayed on the display device may include, for example, options associated with a duplex function for performing duplex copying in the image forming apparatus. The duplex function include a "simplex to duplex" function for performing image formation on both sides of predetermined sheets on the basis of originals which have images formed only on one sides of predetermined sheets, a "duplex to simplex" function for performing image formation on one of the sides of sheets on the basis of originals with images formed on both of the sides of sheets, a "duplex to duplex" function for performing image formation on both sides of sheets on the basis of originals with images formed on both sides of sheets, and the like.

Figure 15:
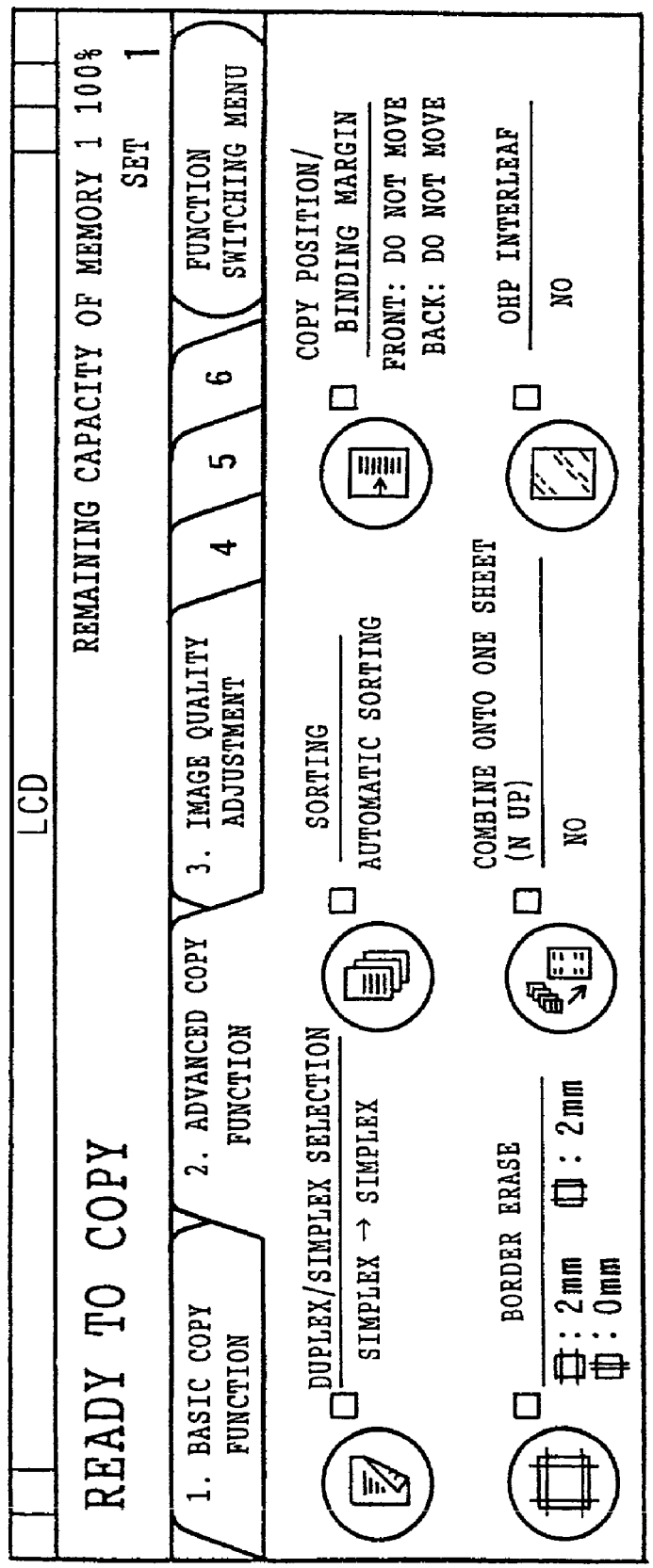
FIG. 15 is a chart illustrating an exemplary case in which a screen for selection of a desired function among predetermined functions is displayed on the display device according to the embodiment of the present invention.
Figure 16:
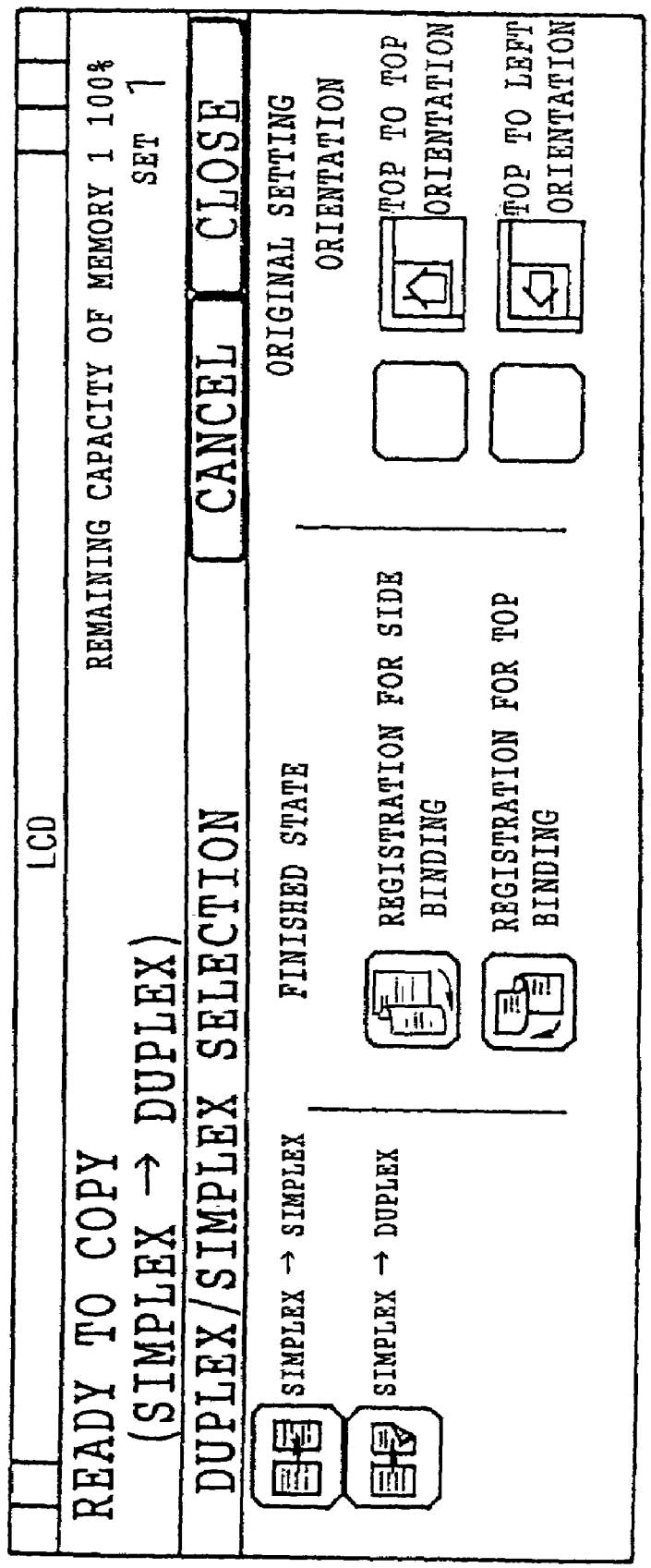
FIG. 16 is a chart illustrating a state of a conventional display device in which options associated with the so-called duplex function are displayed, and two buttons of all buttons are disposed thereon.

Further, on the display device, the options may include options associated with particular functions, and the options associated with the particular functions may be displayed when the particular functions are selected on a predetermined screen. Here, the options associated with the particular functions are options associated with predetermined functions, and do not include those general options, such as "yes", "no", and the like, which can be used for any functions. Therefore, for example, options associated with the duplex function include options such as "simplex to duplex", "duplex to duplex", and the like, and options associated with sheets on which images are formed include options such as "A4 portrait", "B4 landscape", and the like. Further, these options are displayed when a predetermined function selection screen (for example, a display screen shown in FIG. 15) is displayed on the display device, and a desired function (for example, "duplex/simplex selection" shown in FIG. 15) is selected on the function selection screen.

Figure 5B:
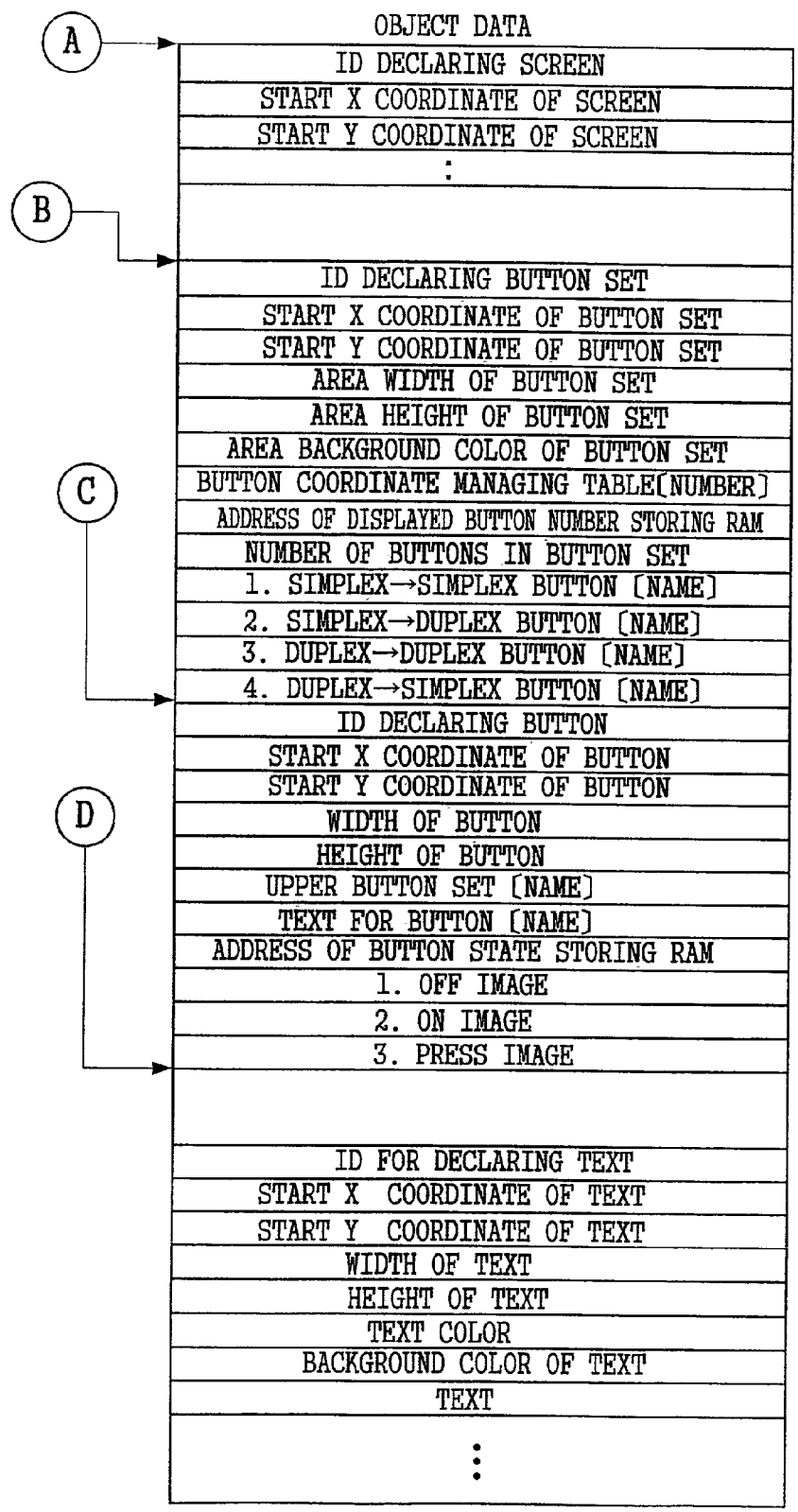
FIG. 5B is a chart illustrating contents of object data in the frame ROM shown in FIG. 4.
Figure 6A:
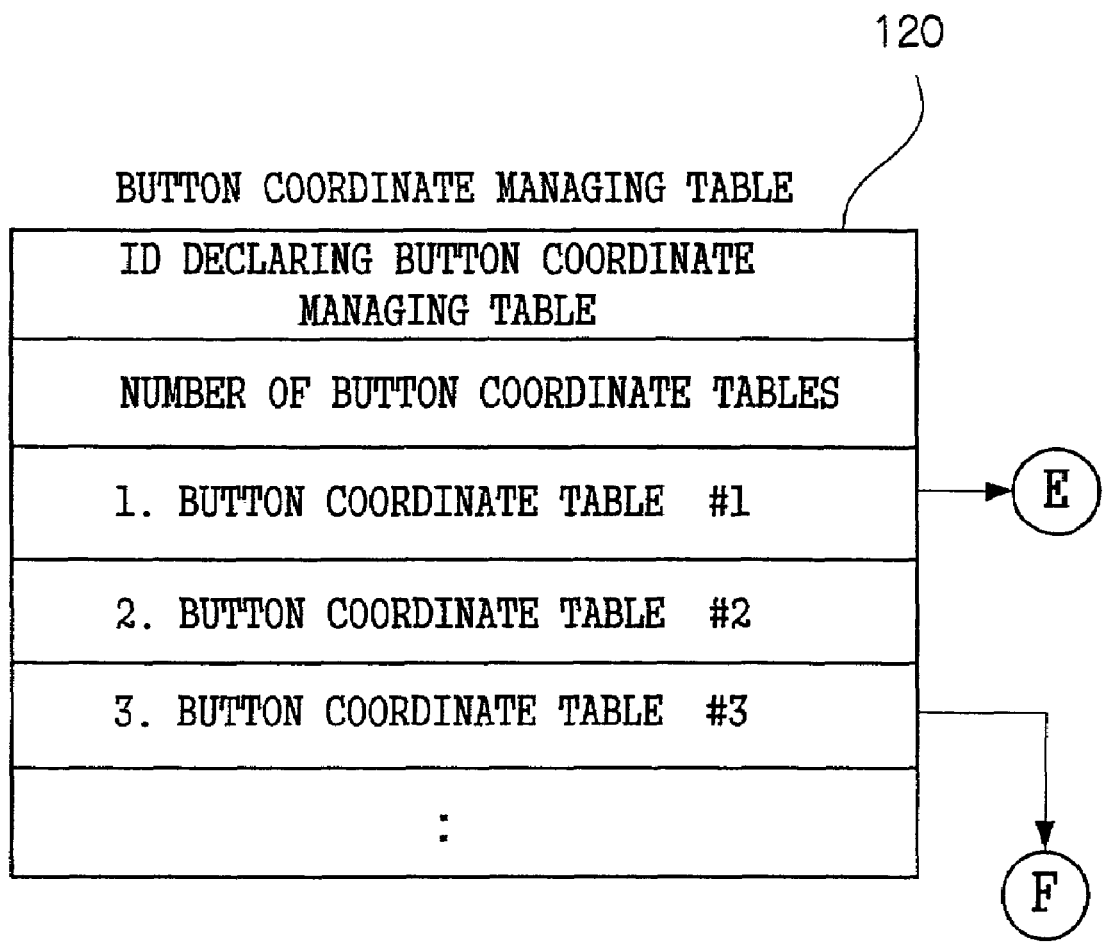
FIGS. 6A-6C are charts illustrating contents of a button coordinate managing table in the object data shown in FIG. 5B.
Figure 6:
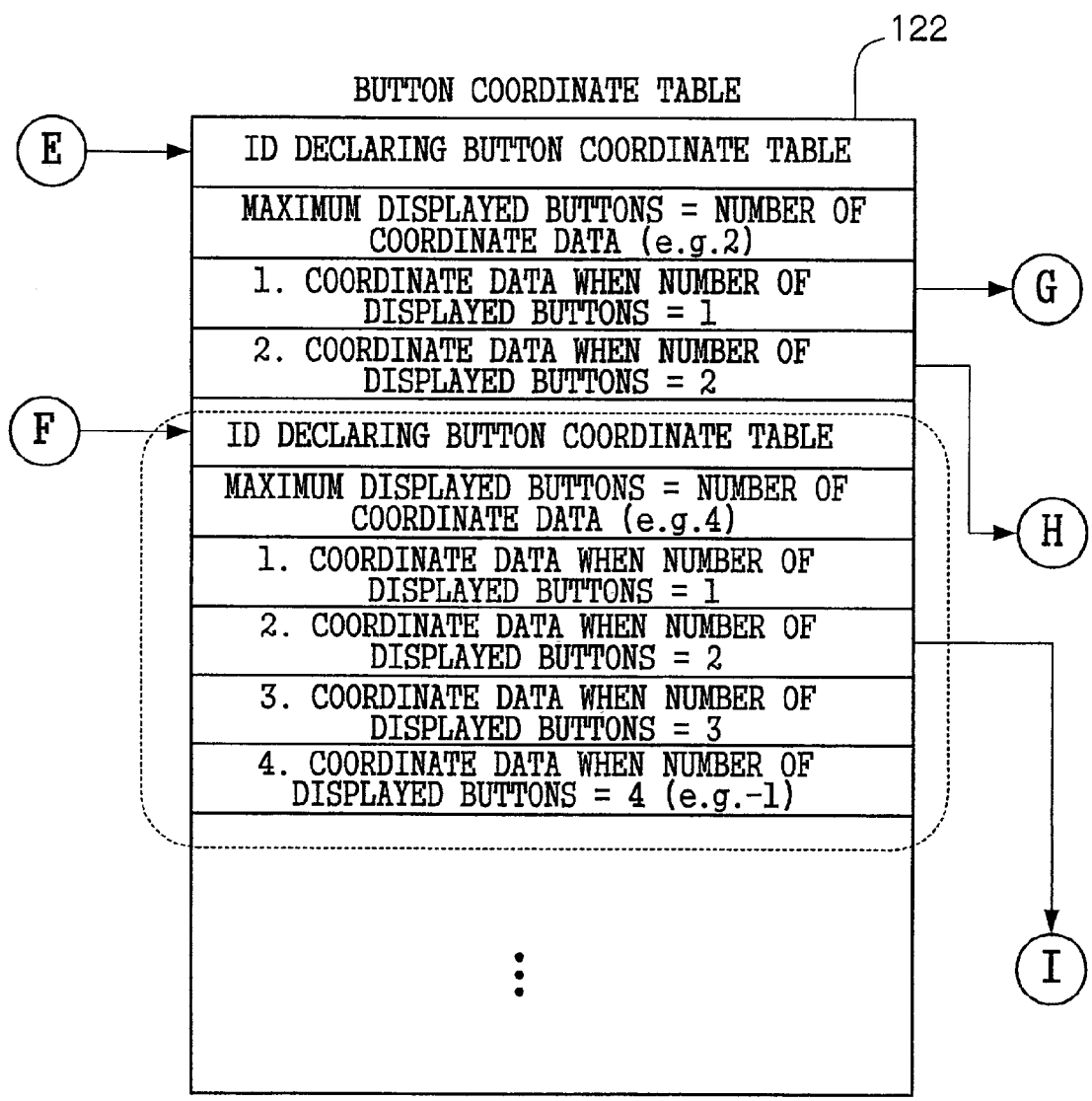

According to FIGS. 5 and 6, screen data for displaying the buttons and keys to be displayed on the touch panel 18 is described. Note that, FIG. 5 shows an object definition table, an object table, and the like, which are used when buttons and keys used for selection and setting of the duplex function are displayed on the touch panel 18 when the operation control section is adapted for an image forming apparatus having the so-called duplex function.

As shown in FIG. 5A, an object definition table 106 includes descriptions of object names (offset addresses from the top of the object definition table) and pointers to the object data 108 (offset addresses from the top of the object data), respectively in pairs, for respective components (objects), such as buttons and keys, of the display screen of the touch panel 18.

The object data 108 selected in the object definition table 106 includes descriptions of coordinates of display start positions of respective objects, widths and heights of the respective objects, and the like. Note that, the display start positions of the respective objects are described as X and Y coordinates which are relative coordinates with respect to upper objects.

Specifically, as shown in FIG. 5A for example, in the object definition table, data associated with a series of buttons is stored as a button set, which includes a combination of four duplex/simplex selection buttons: a simplex to simplex button, a simplex to duplex button, a duplex to duplex button and a duplex to simplex button. Further, in the object definition table, data associated with each of the above-described four buttons forming the button set and other necessary data are stored.

While, as shown in FIG. 5B, data such as an ID declaring a button set, coordinates of a display start position of the button set, width and height of an area of the button set, and the like, are stored in the frame ROM 24 as object data for the button set. Further, the object data includes a button coordinate managing table (described later in detail) in which coordinates of display start positions of respective buttons forming the button set are set, an address of a RAM in which the number of buttons forming the button set is set and stored, the number of all buttons forming the button set, and names of the buttons, i.e., offset addresses from the top address in the object definition table. Furthermore, an ID declaring a button, coordinates of a display start position, a width and a height, and the like, for each button forming the button set are also included.

As shown in FIGS. 6A-6C, the button coordinate managing table 120 contains button coordinate tables 122 and coordinate data 124. In each of the button coordinate tables, buttons to be displayed on the touch panel 18 are set for each number of displayed buttons, and are respectively combined into a unit. Coordinates of display positions of respective buttons which are combined and included in the unit are stored in the button coordinate data 124.

FIGS. 7A and 7B shows a button information receiving area coordinate table, which is a table for temporarily storing data of buttons to be displayed on the touch panel 18 from the above-described object data 108 and the button coordinate data, and is created in one of areas in the work RAM 22. Specifically, in the button information receiving area coordinate table, names of the buttons, coordinates of display start positions of the buttons, coordinates of display end positions, states of the buttons, and programs to be called when the respective buttons are pressed are temporarily stored for all the buttons being displayed or have been displayed on the touch panel 18. Note that, the coordinates of the display positions of the respective buttons stored in the button information receiving area coordinate table are absolute coordinates which are obtained by adding the relative coordinates read from the button coordinate data sequentially.

A case in which the CPU 10 controls the display of buttons according to programs stored in the control ROM 20 is described below. This description refers to an image forming apparatus having a duplex function.

First, a base screen is displayed. That is, a screen for selection of duplex/simplex is retrieved from the object definition table 106, and necessary data are detected from the object data 108 through the object definition table 106. Coordinates of display start positions, widths and heights of buttons to be displayed, and colors for filing areas of the buttons to be displayed, which are the detected object data 108, are transferred to the LCD 14 through the LCD driver 12, and a background of the screen is displayed.

Then, preparation for displaying a duplex/simplex selection button group is carried out. Specifically, a button set for selection of duplex/simplex is retrieved from the object definition table in the frame ROM 24, and data which is necessary for displaying buttons contained in the object data is detected through the object definition table. Subsequently, data of coordinates of display start positions, widths, heights, and the like, for the detected button set are read and stored in the frame RAM 26. At this time, relative coordinates, which are the read coordinates of the display positions, are converted into absolute coordinates. Then, considering functions, such as an automatic duplex document feeding, added to the image forming apparatus, and the like, the number of buttons to be displayed among buttons forming the button set is calculated, and the calculated number of buttons to be displayed may be set in a storing area for number of display button.

That is, whether all of the options are displayed or some of the options are displayed on the display device may be determined according to mounting conditions of additional devices.

In the display device structured as described above, whether the display device displays all of the displayable options or some of the displayable options is determined according to mounting conditions of additional devices. When the display device is used in an image forming apparatus, for example, the additional devices herein refer to devices which can be added to the image forming apparatus and thereby increasing functions which can be performed in the image forming apparatus, such as post processing devices for performing post processing such as punching and stapling on sheets on which images are formed, an automatic document feeder (ADF) for automatically feeding a plurality of originals, and the like. The mounting conditions herein refer to whether the additional devices are mounted or not, and if mounted, whether functions of the additional devices can be actually used or not. Therefore, if all of the additional devices are added and all of the added functions are available, all of the options associated with the functions are displayed on the display device. On the other hand, when only some of the additional devices are added and only some of the functions are available, only options associated with the available functions are displayed.

Subsequently, if the button coordinate managing table for the number of buttons to be displayed is set, the button coordinate table is detected from the button coordinate managing table, and button coordinate data for the number of buttons to be displayed is detected from the detected button coordinate table. Thereafter, coordinate data to be used for displaying buttons are determined on the basis of the detected button coordinate data, and are stored in the frame RAM 26. If the button coordinate managing table is not set, or if the button coordinate data for the number of buttons to be displayed is not set even when the button coordinate managing table is set, the button coordinate data to be used is "none".

Specifically, if "2" is set as the button coordinate managing table for the duplex/ simplex button set, a button coordinate managing table #2 (see FIGS. 6A-6C) is referred to, and a button coordinate table to be used is determined by following a pointer set in the button coordinate managing table #2. Further, if an automatic duplex document feeder is not added as an option, two buttons in the duplex/simplex button set are displayed. In this case, button coordinate data to be used are determined by following pointers set in a button coordinate table #2. Furthermore, if an automatic duplex document feeder is added as an option, four buttons are displayed. In this case, a button coordinate table #4 is not set, and therefore, button coordinate data to be used is "none" (see FIGS. 6A-6C).

The buttons to be displayed of the duplex/simplex button set are sequentially retrieved from the object definition table, and necessary data are detected from the object data through the object definition table. As described above, if the button coordinate managing table is set, coordinates of display start positions of the buttons, which are the detected object data, are read and converted into absolute coordinates in the order in which the buttons are to be displayed. If the button coordinate managing table is not set, coordinates of the display start position of the button in the object data are read and converted into absolute coordinates.

For example, if two buttons: the "simplex to simplex" button and the "simplex to duplex" button in the duplex/simplex button set are displayed in this order, since the button coordinate managing table #2 is set as described above, button coordinate data contained in the button coordinate managing table #2 are used as the coordinates of the display start positions of the respective buttons. That is, the first button coordinate data in the button coordinate managing table #2 is used for the first "simplex to simplex" button, and the second button coordinate data in the button coordinate managing table #2 is used for the "simplex to duplex" button.

If all of the four buttons in the duplex/simplex button set are displayed, since the button coordinate managing table is not set, coordinates of display start positions set for the respective buttons in the object data are used as coordinates of the display start positions of the respective buttons.

Then, after the coordinates of the display start positions have been determined, the determined coordinates and images corresponding to states of the buttons are transferred to the LCD 14 through the LCD driver 12 for displaying the respective buttons. At this time, names of the buttons, coordinates of display end positions calculated from coordinates of the display start positions, widths and heights of the buttons, states of the buttons, and a button-press program for determining whether or not button information can be received, for making a sound when button information is received, and for switching between button images are set in the button information receiving area coordinate table 128 (see FIGS. 7A and 7B).

Figure 10:
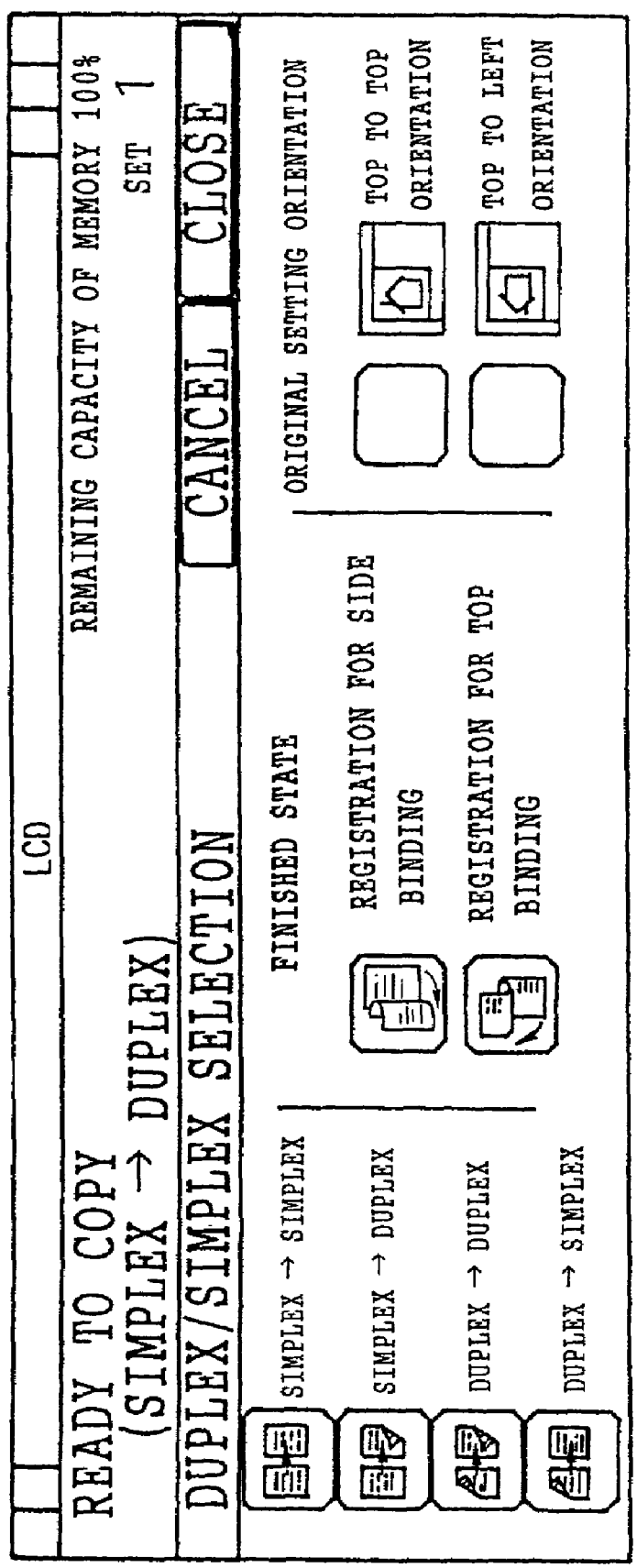
FIG. 10 is a chart illustrating a state of the display device according to the embodiment of the present invention, in which options associated with the so-called duplex function are displayed, and all buttons are disposed thereon.

As described above, buttons are displayed on the touch panel according to the set button information receiving area coordinate table 128. According to the button information receiving area coordinate table 128 shown in FIG. 7A, all the buttons are displayed as shown in FIG. 10, and according to the button information receiving area coordinate table 128 shown in FIG. 7B, two buttons are arranged in a well-balanced manner as shown in FIG. 9. By arranging the buttons in a well-balanced manner, appearance of the display device is improved.

As shown in FIG. 8, bitmap image data for buttons in an ON state, in an OFF state and in a pressed state are prepared in advance, and switching between images for a button is carried out by reading and displaying one of the image data according to the state of the button.

At this time, if a label is added to the button, retrieval for the labels from the object definition table is carried out, and necessary data are detected from the object data through the object definition table. Then, coordinates of the display start position are converted into absolute coordinates, and the absolute coordinates, a text, a background color and a character code are transferred to the LCD 14 through the LCD driver 12 for displaying the label.

Similarly, other buttons, keys and objects other than buttons and keys can be displayed on the touch panel. For example, in a case of a text object, the relevant object is retrieved from the object definition table, necessary data is detected from the object data, and coordinates, a text color, a background color, and a character code of the object are transferred to the LCD 14 through the LCD driver 12.

An operation at the CPU 10 when a button is pressed and then is released is described below.

Coordinate data of a pressed position is sent from the touch panel 18 through the panel driver 16 to the CPU 10. On the basis of the coordinate data, the button information receiving area coordinate table is scanned, and a search is carried out to determine between which button's display start position coordinates and display end position coordinates (i.e., in which button's display area) the pressed position is located. As a result of the search, if a relevant button exists, the button-press program is called, and a name of the relevant button and data regarding the fact that the relevant button is pressed are sent to the program.

The called button-press program determines whether the button is currently selectable or not. If the button is selectable, the button-press program sounds an acceptance sound. Then, a PRESS image for the button is retrieved from the object data through the object definition table, and the retrieved PRESS image is transferred to the LCD 14 through the LCD driver 12.

Subsequently, coordinate data of a released position is sent from the touch panel 18 through the panel driver 16 to the CPU 10. Similarly, on the basis of the coordinate data, the button information receiving area coordinate table is scanned, and a search is carried out to determine between which button's display start position coordinates and display end position coordinates (i.e., in which button's display area) the released position is located. As a result of the search, if a relevant button exists, the button-press program is called, and a name of the relevant button and data regarding the fact that the relevant button is released are sent to the program.

At this time, the called button-press program determines a state of the released button, i.e., whether the button is in the ON state or in the OFF state, on the basis of a state of the button before it was pressed. According to a result of the determination, a bitmap image for the relevant button corresponding to the result of the determination is retrieved from the object data through the object definition table, and the retrieved bitmap image is transferred to the LCD 14 through the LCD driver 12. In this manner, the operation when a button is pressed and then is released is carried out.

With reference to FIGS. 9 and 10, a procedure for switching from a state in which all buttons forming a button set are displayed (see FIG. 10) into a state in which some of the buttons forming the button set are displayed (see FIG. 9) is described below. In this description, a case in which an image forming apparatus has the duplex function and is not provided with an automatic duplex document feeder is described.

First, two buttons corresponding to "duplex to duplex" and "duplex to simplex" are deleted. Specifically, the "duplex to duplex" button and the "duplex to simplex" button are retrieved from the object definition table, and necessary data are detected from the object data through the object definition table. Then, "not displayed" states for the relevant data are set in the button state storing area. Then, the duplex/simplex button set including all the buttons for the duplex function is retrieved from the object definition table, data for the button set is detected, and buttons not to be displayed are subtracted from the detected data. At this time, buttons to be displayed among buttons forming the duplex/simplex button set are two.

Subsequently, an area of the duplex/simplex button set is erased. That is, coordinates of display start positions, widths and heights of the buttons, and a color for filling the area, which are described in the detected object table for the duplex/simplex button set, are transferred to the LCD 14 through the LCD driver 12, and the area of the duplex/simplex button set is once erased. Thus, all the buttons including the "duplex to duplex" button, the "simplex to simplex" button and labels thereof are erased.

Then, similarly to the above-described operation, if the button coordinate managing table for the number of buttons to be displayed is set, the button coordinate table is detected from the button coordinate managing table, and button coordinate data for the number of buttons to be displayed is detected from the detected button coordinate table. Thereafter, coordinate data to be used for displaying the buttons are determined on the basis of the detected button coordinate data, and are stored in the frame RAM 26.

The buttons to be displayed of the duplex/simplex button set are sequentially retrieved from the object definition table, and necessary data are detected from the object data through the object definition table. Then, coordinates of display start positions of the buttons, which are the detected object data, are read and converted into absolute coordinates. After the coordinates of the display start positions have been determined, the determined coordinates and images corresponding to states of the buttons are transferred to the LCD 14 through the LCD driver 12 for displaying the respective buttons.

In this manner, display of buttons on the touch panel is switched, and the state shown in FIG. 10, in which all the buttons are displayed according to the button information receiving area coordinate table 128 shown in FIG. 7A is switched into the state shown in FIG. 9, in which two buttons are arranged in a well-balanced manner according to the button information receiving area coordinate table 128 shown in FIG. 7B. By arranging the buttons in a well-balanced manner, appearance of the display device is improved.

Note that, a display control means for displaying options in a uniform arrangement when the number of the options to be displayed is changed may be provided. For example, when the number of options to be displayed is changed because of addition or removal of additional devices, or the like, if display positions of the options which are not to be displayed are left as blanks, appearance of the display is impaired. Therefore, when the number of options to be displayed is changed, displayed options are uniformly arranged. Thus, the options are displayed in a well-balanced arrangement, thereby improving appearance of the display device.

In the embodiment described above, the number of buttons to be displayed, display positions of buttons, and the like, are determined on the basis of data stored in the button coordinate managing table 120, the button coordinate table 122 and the button coordinate data 124 shown in FIGS. 6A-6C.

That is, the above-described display device is provided with a storing means which stores, in advance, display data for displaying, for example, the above-described options, and when the number of options to be displayed is changed because of addition or removal of additional devices, the display control means retrieves suitable display data from the storing means, and displays options on the basis of the display data.

However, display positions of buttons may be determined by calculation.

In this case, the display device is provided, for example, with a calculating means for calculating display positions of options. If the number of options to be displayed on the display device is changed, the calculating means calculates the display positions of the options so that the display positions of the options are changed. Changes of the display positions may be carried out so that the options are arranged as a user desires, or they may be arranged uniformly.

Specifically, calculation of display positions of a group of buttons is performed as described below on the basis of an origin of a display position of a button group to be displayed, a height of the button group, and heights of respective buttons included in the button group, which are stored in the object data shown in FIG. 5B.

a height of a button group÷the number of buttons to be displayed=a height of a display area for one button the height of the display area for one button−a height of the button=a height of a space area in the display area for one button the height of the space area in the display area for one button÷2=a height of an upper or a lower space area in the display area for one button an origin of the button group+the height of the upper or the lower space area in the display area for one button=Y coordinate for the first button the Y coordinate for the first button+the height of the display area for one button=Y coordinate for the second button the Y coordinate for the second button+the height of the display area for one button=Y coordinate for the third button Y coordinate for the (N−1)th button+the height of the display area for one button=Y coordinate for Nth button More specifically, for example, if the number of buttons included in a button group is four, Y coordinate at an origin of the button group=80, a height of the button group=160, and a height of each button=40, the above calculation is carried out as follows:

160÷4=40 (a height of a display area for one button)

40−40=0 (a height of a space area in the display area for one button)

0÷2=0 (a height of an upper or a lower space area in the display area for one button)

Then, Y coordinates for the respective buttons are given by:

the first button=80 (the origin of the button group)+0 (the height of the upper space area for one button)=80 the second button=80 (the first button)+40 (the height of the display area for one button)=120 the third button=120 (the second button)+40 (the height of the display area for one button)=160 the fourth button=160 (the third button)+40 (the height of the display area for one button)=200

Figure 11A:
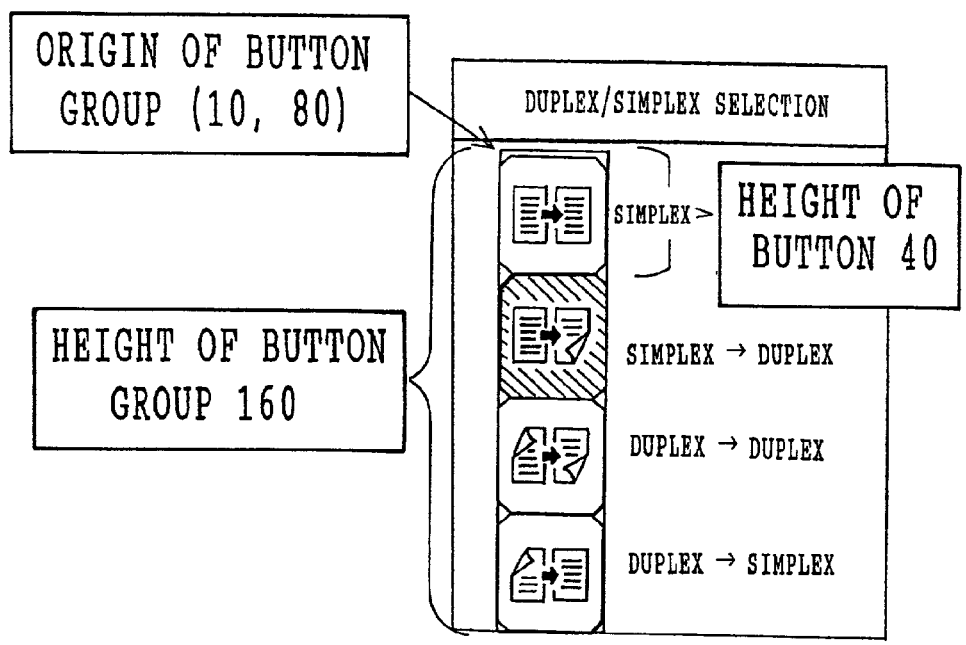
FIG. 11A is a chart illustrating a state of the display device according to the embodiment of the present invention, in which options associated with the so-called duplex function are displayed, and four buttons are displayed.

FIG. 11A shows a state in which the four buttons are displayed.

If the coordinate at the origin of the button group and the height of the button group are the same as that of the previous example, but the number of buttons included in the button group is two:

160÷2=80 (a height of a display area for one button)

80−40=40 (a height of a space area in the display area for one button)

40÷2=20 (a height of an upper or a lower space area in the display area for one button)

Then, Y coordinates for the respective buttons are given by:

the first button=80 (the origin of the button group)+20=100 the second button=100 (the first button)+80=180

Figure 11B:
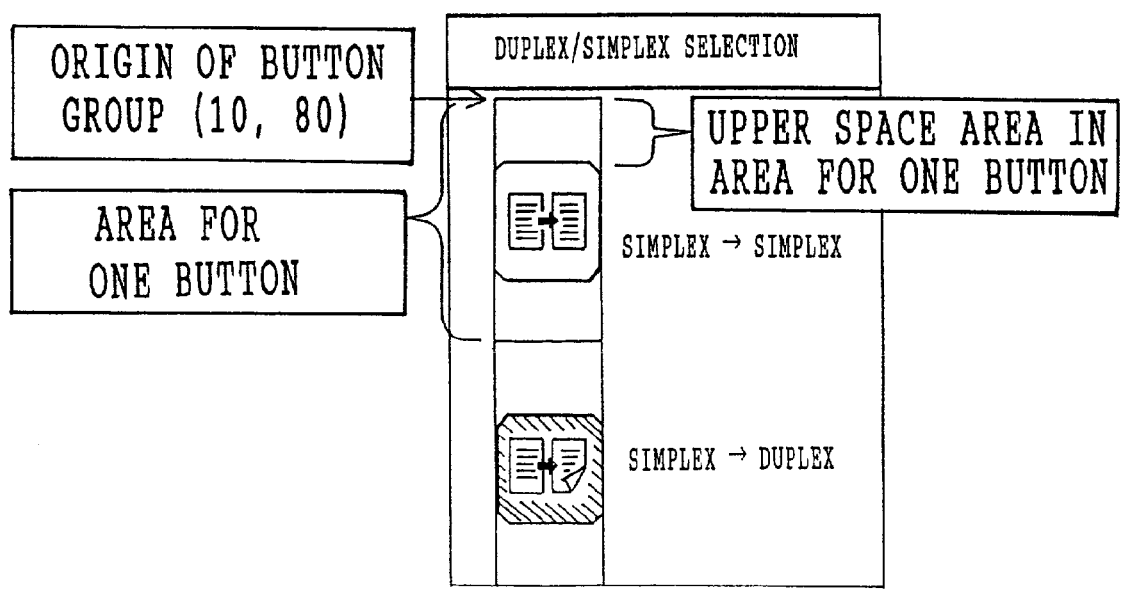
FIG. 11B is a chart illustrating a state of the display device according to the embodiment of the present invention, in which options associated with the so-called duplex function are displayed, and two buttons are displayed.

FIG. 11B shows a state in which the two buttons are displayed.

Figure 12:
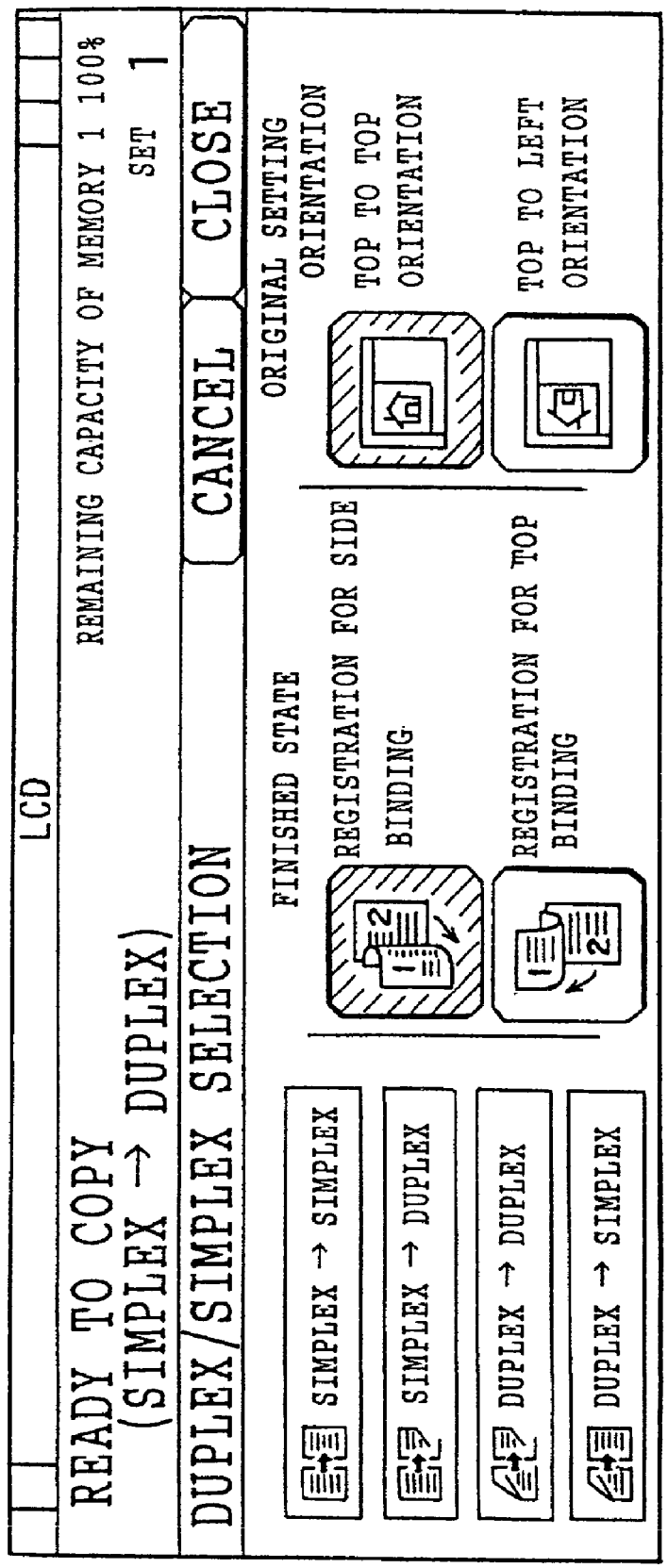
FIG. 12 is a chart illustrating a state of the display device according to the embodiment of the present invention, in which options associated with the so-called duplex function are displayed, and shapes of displayed buttons are changed.
Figure 13:
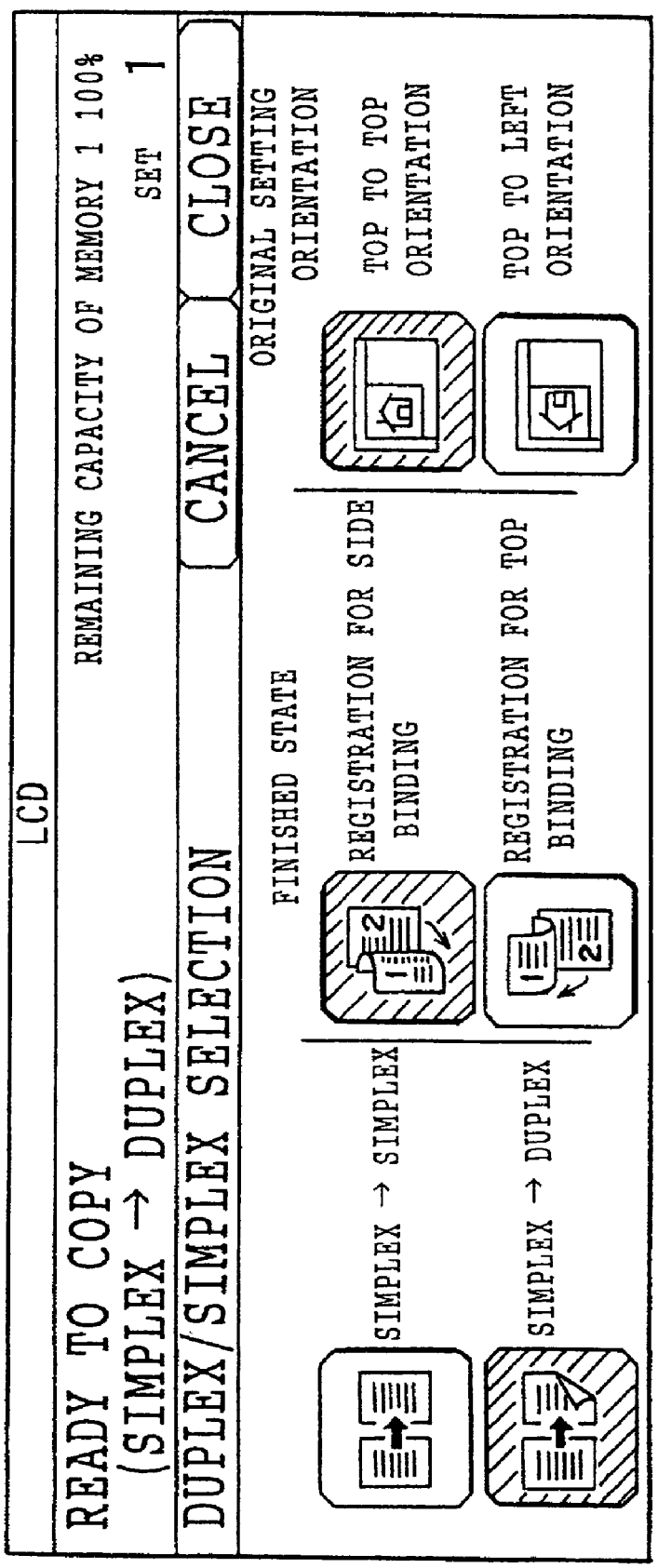
FIG. 13 is a chart illustrating a state of the display device according to the embodiment of the present invention, in which options associated with the so-called duplex function are displayed, and the number and size of displayed buttons are changed.

Shapes of buttons to be displayed can be changed by replacing image data for the buttons shown in FIG. 8, which are used to display the buttons. Further, a plurality of different types of image data may be stored in the frame ROM 24 in advance, and suitable ones can be selected from the plurality of different types of image data for displaying buttons. Furthermore, shapes of the displayed buttons can be switched according to the number of the displayed buttons by setting image data for buttons to be displayed for each number and each pattern of displayed buttons similarly to the coordinate managing table, the button coordinate table and the button coordinate data shown in FIG. 6. Similarly, by setting display positions of texts associated with buttons for each number and each pattern of displayed buttons, the texts can also be displayed in positions corresponding to changed button shapes according to changes of the number of displayed buttons. FIG. 12 shows buttons in different shapes. FIG. 13 shows a screen in a case in which the number of duplex/simplex selection buttons is reduced from four (the state shown in FIG. 12) to two, and the shapes of the buttons are changed.

Figure 14B:
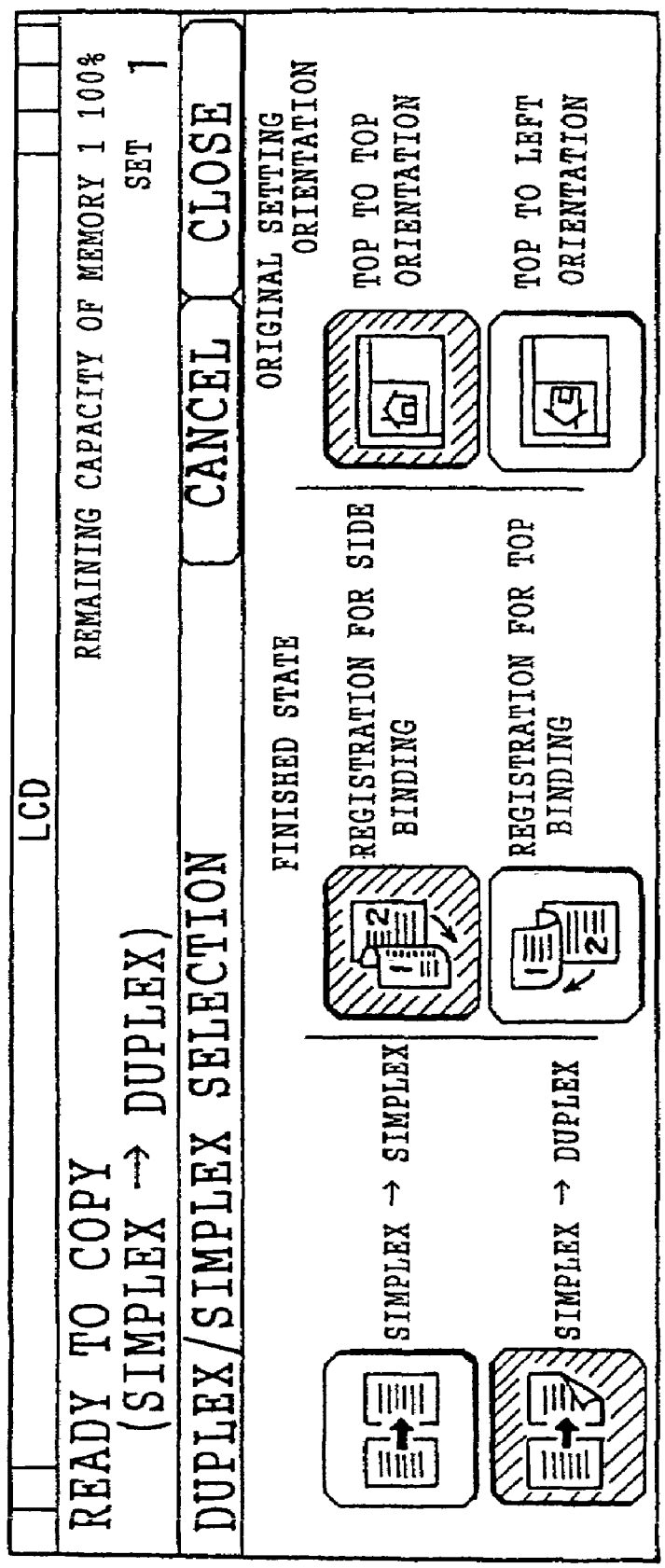
FIG. 14B is a chart illustrating a state of the display device according to the embodiment of the present invention, in which options associated with the so-called duplex function are displayed, and size and display positions of two buttons being displayed are changed.

Further, in order to change the size of the displayed buttons, image data of buttons having different sizes may be stored in the frame ROM 24 as the image data of buttons. Alternatively, different display scaling factors may be set for each number of buttons to be displayed, and when the buttons are displayed, image data can be enlarged or reduced on the display according to the scaling factors. Thus, the size of the buttons can be changed according to the number of the buttons, and spaces or blanks at which buttons are not displayed can be eliminated when the number of buttons to be displayed is reduced, thereby improving appearance of the display device. FIG. 14A shows a state in which four buttons associated with the duplex/simplex selection are displayed, and FIG. 14B shows a state in which the number of buttons is reduced to two from the state shown in FIG. 14A and the size of the displayed buttons are enlarged accordingly. Note that, the display positions of the texts associated with buttons are stored in the frame ROM 24 as data of relative coordinates from the buttons, and by similarly applying the set scaling factors to the data in X direction and Y direction, the texts can be displayed in positions corresponding to the size of the buttons.

As described above, the present invention has an excellent effect that a display which is pleasing in appearance can be accomplished by suitably adjusting the display positions of the buttons.

What is claimed is:

1. An image forming apparatus, comprising:
   a display that displays an image indicating a function and allows a user to instruct the image forming apparatus to perform the function by selecting the image; and
   a display arrangement control device that judges functions added to the image forming apparatus, that determines where to position images to be displayed in the display, each of the images to be displayed indicating a function which is judged to be added to the image forming apparatus, and that displays the images on the display according to the determined positioning,
   wherein a plurality of images are displayed in a first case, less than all of the plurality of images displayed in the first case are displayed in a second case, and the display arrangement control device determines the positioning so that at least one image is displayed in a position which is different in the first case than in the second case, and
   the display of the image indicating the function added to the image forming apparatus is determined according to mounting conditions of additional devices added to the image forming apparatus.

2. The image forming apparatus according to claim 1, wherein the display further comprises a touch panel display device which allows a user to instruct by touching a display area thereof.

3. The image forming apparatus according to claim 1, wherein the display arrangement control device controls the arrangement of images to be displayed, when a number of the images to be displayed is changed, so that images to be newly displayed are displayed in a uniform arrangement.

4. The image forming apparatus according to claim 1, further comprising a calculating device for determining by calculation display positions of images when a number of the images to be displayed is changed.

5. The image forming apparatus according to claim 1, wherein the images indicate options associated with a function, and the options associated with the function are displayed by selecting an image indicating the function.

6. The image forming apparatus according to claim 1, wherein a size of a range in which the images are displayed is the same in the first case and the second case.

7. An image forming apparatus, comprising:
   a display that displays an image indicating a function and allows a user to instruct the image forming apparatus to perform the function by selecting the image; and
   a display arrangement control device that judges functions added to the image forming apparatus, that determines where to position images to be displayed in the display, each of the images to be displayed indicating a function which is judged to be added to the image forming apparatus, and that displays the images on the display according to the determined positioning,
   wherein a plurality of images are displayed in a first case, less than all of the plurality of images displayed in the first case are displayed in a second case, and the display arrangement control device determines the positioning so that at least one image is displayed in a size which is different in the first case than in the second case, and
   the display of the image indicating the function added to the image forming apparatus is determined according to mounting conditions of additional devices added to the image forming apparatus.

8. The image forming apparatus according to claim 7, wherein the display further comprises a touch panel display device which allows a user to instruct by touching a display area thereof.

9. The image forming apparatus according to claim 7, wherein the display arrangement control device controls the arrangement of images to be displayed, when a number of the images to be displayed is changed, so that images to be newly displayed are displayed in a uniform arrangement.

10. The image forming apparatus according to claim 7, further comprising a calculating device for determining by calculation display positions of the images when a number of the images to be displayed is changed.

11. The image forming apparatus according to claim 7, wherein the images indicate options associated with a function, and the options associated with the function are displayed by selecting an image indicating the function.

12. An image forming apparatus, comprising:
   a display that displays an image indicating a function and allows a user to instruct the image forming apparatus to perform the function by selecting the image; and
   a display arrangement control device that judges functions added to the image forming apparatus, that determines where to position images to be displayed in the display, each of the images to be displayed indicating a function which is judged to be added to the image forming apparatus, and that displays the images on the display according to the determined positioning,
wherein a plurality of images are displayed in a first case, less than all of the plurality of images displayed in the first case are displayed in a second case, and the display arrangement control device determines the positioning so that at least one image is displayed in a shape which is different in the first case than in the second case, and
the display of the image indicating the function added to the image forming apparatus is determined according to mounting conditions of additional devices added to the image forming apparatus.

13. The image forming apparatus according to claim 12, wherein the display further comprises a touch panel display device which allows a user to instruct by touching a display area thereof.

14. The image forming apparatus according to claim 12, wherein the display arrangement control device controls the arrangement of images to be displayed, when a number of the images to be displayed is changed, so that images to be newly displayed are displayed in a uniform arrangement.

15. The image forming apparatus according to claim 12, further comprising a calculating device for determining by calculation display positions of the images when a number of the images to be displayed is changed.

16. The image forming apparatus according to claim 12, wherein the images indicate options associated with a function, and the options associated with the function are displayed by selecting an image indicating the function.

17. An image forming apparatus, comprising:
a display that displays an image indicating a function and allows a user to instruct the image forming apparatus to perform the function by selecting the image; and
a display arrangement control device that judges functions added to the image forming apparatus, that determines where to position images to be displayed in the display, each of the images to be displayed indicating a function which is judged to be added to the image forming apparatus, and that displays the images on the display according to the determined positioning,
wherein a plurality of images are displayed in a first case, less than all of the plurality of images displayed in the first case are displayed in a second case, and the display arrangement control device determines the positioning so that the images are displayed with a larger interval between the images in the second case than in the first case, and
the display of the image indicating the function added to the image forming apparatus is determined according to mounting conditions of additional devices added to the image forming apparatus.

18. The image forming apparatus according to claim 17, wherein the display further comprises a touch panel display device which allows a user to instruct by touching a display area thereof.

19. The image forming apparatus according to claim 17, wherein the display arrangement control controls the arrangement of images to be displayed, when a number of the images to be displayed is changed, so that images to be newly displayed are displayed in a uniform arrangement.

20. The image forming apparatus according to claim 17, further comprising a calculating device for determining by calculation display positions of the images when a number of the images to be displayed is changed.

21. The image forming apparatus according to claim 17, wherein the images indicate options associated with a function, and the options associated with the function are displayed by selecting an image indicating the function.

22. An image forming apparatus, comprising:
a display that displays an image indicating a function and allows a user to instruct the image forming apparatus to perform the function by selecting the image; and
a display arrangement control device that judges functions added to the image forming apparatus, that determines where to position images to be displayed in the display, each of the images to be displayed indicating a function which is judged to be added to the image forming apparatus, and that displays the images on the display according to the determined positioning,
wherein a plurality of images are displayed in a first case, less than all of the plurality of images displayed in the first case are displayed in a second case, and the display arrangement control device determines the positioning so that the images are displayed in a larger size in the second case than in the first case, and
the display of the image indicating the function added to the image forming apparatus is determined according to mounting conditions of additional devices added to the image forming apparatus.

23. The image forming apparatus according to claim 22, wherein the display further comprises a touch panel display device which allows a user to instruct by touching a display area thereof.

24. The image forming apparatus according to claim 22, wherein the display arrangement control device controls the arrangement of images to be displayed, when a number of the images to be displayed is changed, so that images to be newly displayed are displayed in a uniform arrangement.

25. The image forming apparatus according to claim 22, further comprising a calculating device for determining by calculation display positions of the images when a number of the images to be displayed is changed.

26. The image forming apparatus according to claim 22, wherein the images indicate options associated with a function, and the options associated with the function are displayed by selecting an image indicting the function.

\* \* \* \* \*